(12) United States Patent
Broussard et al.

(10) Patent No.: US 12,209,490 B2
(45) Date of Patent: Jan. 28, 2025

(54) SYSTEM FOR PUMPING HYDRAULIC FRACTURING FLUID USING ELECTRIC PUMPS

(71) Applicant: U.S. Well Services, LLC, Willow Park, TX (US)

(72) Inventors: Joel N. Broussard, Lafayette, LA (US); Jeff McPherson, Spring, TX (US); Robert Kurtz, Fairmont, WV (US)

(73) Assignee: U.S. Well Services, LLC, Willow Park, TX (US)

( * ) Notice: Subject to any disclaimer, the term of this patent is extended or adjusted under 35 U.S.C. 154(b) by 0 days.

(21) Appl. No.: 18/484,303

(22) Filed: Oct. 10, 2023

(65) Prior Publication Data

US 2024/0287885 A1    Aug. 29, 2024

Related U.S. Application Data

(63) Continuation of application No. 17/493,092, filed on Oct. 4, 2021, now abandoned, which is a continuation
(Continued)

(51) Int. Cl.
*E21B 43/26* (2006.01)
*E21B 43/267* (2006.01)
(Continued)

(52) U.S. Cl.
CPC ........ *E21B 43/2607* (2020.05); *E21B 43/267* (2013.01); *F01D 15/08* (2013.01);
(Continued)

(58) Field of Classification Search
CPC ...................................................... E21B 43/26
See application file for complete search history.

(56) References Cited

U.S. PATENT DOCUMENTS

| | | | |
|---|---|---|---|
| 1,656,861 | A | 1/1928 | Leonard |
| 1,671,436 | A | 5/1928 | Melott |
| (Continued) | | | |

FOREIGN PATENT DOCUMENTS

| | | |
|---|---|---|
| AU | 2007340913 | 7/2008 |
| CA | 2406801 | 11/2001 |
| (Continued) | | |

OTHER PUBLICATIONS

International Search Report and Written Opinion mailed in PCT/US2020/066543 mailed May 11, 2021.
(Continued)

*Primary Examiner* — Kenneth L Thompson
(74) *Attorney, Agent, or Firm* — Henry Patent Law Firm PLLC

(57) ABSTRACT

A system for hydraulically fracturing an underground formation in an oil or gas well to extract oil or gas from the formation, the oil or gas well having a wellbore that permits passage of fluid from the wellbore into the formation. The system includes a plurality of electric pumps fluidly connected to the well, and configured to pump fluid into the wellbore at high pressure so that the fluid passes from the wellbore into the, and fractures the formation. The system can also include a plurality of natural gas powered generators electrically connected to the plurality of electric pumps to provide electrical power to the pumps.

17 Claims, 2 Drawing Sheets

Related U.S. Application Data of application No. 16/456,777, filed on Jun. 28, 2019, now Pat. No. 11,136,870, which is a continuation of application No. 15/202,085, filed on Jul. 5, 2016, now Pat. No. 10,337,308, which is a continuation of application No. 13/679,689, filed on Nov. 16, 2012, now Pat. No. 9,410,410.

(51) Int. Cl.

| | | |
|---|---|---|
| F01D 15/08 | (2006.01) | |
| F01D 15/10 | (2006.01) | |
| F02C 3/22 | (2006.01) | |
| F04B 17/03 | (2006.01) | |
| F04B 19/22 | (2006.01) | |
| F04B 49/20 | (2006.01) | |
| H02P 23/00 | (2016.01) | |

(52) U.S. Cl.
CPC ............... *F01D 15/10* (2013.01); *F02C 3/22* (2013.01); *F04B 17/03* (2013.01); *F04B 19/22* (2013.01); *F04B 49/20* (2013.01); *H02P 23/00* (2013.01); *F05D 2220/32* (2013.01)

(56) References Cited

U.S. PATENT DOCUMENTS

| | | |
|---|---|---|
| 2,004,077 A | 6/1935 | McCartney et al. |
| 2,183,364 A | 12/1939 | Bailey |
| 2,220,622 A | 11/1940 | Homer |
| 2,248,051 A | 7/1941 | Armstrong et al. |
| 2,407,796 A | 9/1946 | Page |
| 2,416,848 A | 3/1947 | Stewart |
| 2,533,001 A | 12/1950 | Eberhard |
| 2,610,741 A | 9/1952 | Schmid |
| 2,753,940 A | 7/1956 | Bonner |
| 2,976,025 A | 3/1961 | Pro |
| 3,055,682 A | 9/1962 | Bacher et al. |
| 3,061,039 A | 10/1962 | Peters |
| 3,066,503 A | 12/1962 | Fleming et al. |
| 3,075,136 A | 1/1963 | Jones |
| 3,186,222 A | 6/1965 | Martin |
| 3,262,036 A | 7/1966 | Clarke et al. |
| 3,302,069 A | 1/1967 | Wilcox |
| 3,334,495 A | 8/1967 | Jensen et al. |
| 3,722,595 A | 3/1973 | Kiel |
| 3,764,233 A | 10/1973 | Strickland |
| 3,773,140 A | 11/1973 | Mahajan et al. |
| 3,837,179 A | 9/1974 | Barth |
| 3,849,662 A | 11/1974 | Blaskowski et al. |
| 3,878,884 A | 4/1975 | Raleigh |
| 3,881,551 A | 5/1975 | Terry et al. |
| 4,037,431 A | 7/1977 | Sugimoto |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,411,313 A | 10/1983 | Johnson et al. |
| 4,432,064 A | 2/1984 | Barker et al. |
| 4,442,665 A | 4/1984 | Fick et al. |
| 4,456,092 A | 6/1984 | Kubozuka et al. |
| 4,506,982 A | 3/1985 | Smithers et al. |
| 4,512,387 A | 4/1985 | Rodriguez et al. |
| 4,529,887 A | 7/1985 | Johnson |
| 4,538,916 A | 9/1985 | Zimmerman |
| 4,601,629 A | 7/1986 | Zimmerman |
| 4,676,063 A | 6/1987 | Goebel et al. |
| 4,759,674 A | 7/1988 | Schröder et al. |
| 4,768,884 A | 9/1988 | Elkin et al. |
| 4,793,386 A | 12/1988 | Sloan |
| 4,845,981 A | 7/1989 | Pearson |
| 4,922,463 A | 5/1990 | Del Zotto et al. |
| 5,004,400 A | 4/1991 | Handke |
| 5,006,044 A | 4/1991 | Walker, Sr. et al. |
| 5,025,861 A | 6/1991 | Huber et al. |
| 5,050,673 A | 9/1991 | Baldridge |
| 5,114,239 A | 5/1992 | Allen |
| 5,130,628 A | 7/1992 | Owen |
| 5,131,472 A | 7/1992 | Dees et al. |
| 5,172,009 A | 12/1992 | Mohan |
| 5,189,388 A | 2/1993 | Mosley et al. |
| 5,230,366 A | 7/1993 | Marandi |
| 5,366,324 A | 11/1994 | Arlt |
| 5,422,550 A | 6/1995 | McClanahan et al. |
| 5,433,243 A | 7/1995 | Griswold et al. |
| 5,439,066 A | 8/1995 | Gipson |
| 5,486,047 A | 1/1996 | Zimmerman |
| 5,517,822 A | 5/1996 | Haws et al. |
| 5,548,093 A | 8/1996 | Sato et al. |
| 5,590,976 A | 1/1997 | Kilheffer et al. |
| 5,655,361 A | 8/1997 | Kishi |
| 5,736,838 A | 4/1998 | Dove et al. |
| 5,755,096 A | 5/1998 | Holleyman |
| 5,790,972 A | 8/1998 | Kohlenberger |
| 5,813,455 A | 9/1998 | Pratt et al. |
| 5,865,247 A | 2/1999 | Paterson |
| 5,879,137 A | 3/1999 | Yie |
| 5,894,888 A | 4/1999 | Wiemers et al. |
| 5,907,970 A | 6/1999 | Havlovick et al. |
| 5,950,726 A | 9/1999 | Roberts |
| 6,097,310 A | 8/2000 | Harrell et al. |
| 6,138,764 A | 10/2000 | Scarsdale et al. |
| 6,142,878 A | 11/2000 | Barin |
| 6,164,910 A | 12/2000 | Mayleben |
| 6,202,702 B1 | 3/2001 | Ohira et al. |
| 6,208,098 B1 | 3/2001 | Kume et al. |
| 6,254,462 B1 | 7/2001 | Kelton et al. |
| 6,271,637 B1 | 8/2001 | Kushion |
| 6,273,193 B1 | 8/2001 | Hermann et al. |
| 6,315,523 B1 | 11/2001 | Mills |
| 6,442,942 B1 | 9/2002 | Kopko |
| 6,477,852 B2 | 11/2002 | Dodo et al. |
| 6,484,490 B1 | 11/2002 | Olsen et al. |
| 6,491,098 B1 | 12/2002 | Dallas |
| 6,529,135 B1 | 3/2003 | Bowers et al. |
| 6,585,455 B1 | 7/2003 | Petersen et al. |
| 6,626,646 B2 | 9/2003 | Rajewski |
| 6,719,900 B2 | 4/2004 | Hawkins |
| 6,765,304 B2 | 7/2004 | Baten et al. |
| 6,776,227 B2 | 8/2004 | Beida et al. |
| 6,802,690 B2 | 10/2004 | Han et al. |
| 6,808,303 B2 | 10/2004 | Fisher |
| 6,931,310 B2 | 8/2005 | Shimizu et al. |
| 6,936,947 B1 | 8/2005 | Leijon et al. |
| 6,985,750 B1 | 1/2006 | Vicknair et al. |
| 7,082,993 B2 | 8/2006 | Ayoub et al. |
| 7,104,233 B2 | 9/2006 | Ryczek |
| 7,170,262 B2 | 1/2007 | Pettigrew |
| 7,173,399 B2 | 2/2007 | Sihler et al. |
| 7,308,933 B1 | 12/2007 | Mayfield |
| 7,312,593 B1 | 12/2007 | Streicher et al. |
| 7,336,514 B2 | 2/2008 | Amarillas et al. |
| 7,445,041 B2 | 11/2008 | O'Brien |
| 7,494,263 B2 | 2/2009 | Dykstra et al. |
| 7,500,642 B2 | 3/2009 | Cunningham et al. |
| 7,525,264 B2 | 4/2009 | Dodge |
| 7,563,076 B2 | 7/2009 | Brunet et al. |
| 7,581,379 B2 | 9/2009 | Yoshida et al. |
| 7,675,189 B2 | 3/2010 | Grenier |
| 7,683,499 B2 | 3/2010 | Saucier |
| 7,717,193 B2 | 5/2010 | Egilsson et al. |
| 7,755,310 B2 | 7/2010 | West et al. |
| 7,807,048 B2 | 10/2010 | Collette |
| 7,835,140 B2 | 11/2010 | Mori et al. |
| 7,845,413 B2 | 12/2010 | Shampine et al. |
| 8,083,504 B2 | 1/2011 | Williams et al. |
| 7,926,562 B2 | 4/2011 | Poitzsch et al. |
| 7,946,340 B2 | 5/2011 | Surjaatmadja et al. |
| 7,977,824 B2 | 7/2011 | Halen et al. |
| 7,984,757 B1 | 7/2011 | Keast et al. |
| 8,037,936 B2 | 10/2011 | Neuroth et al. |
| 8,054,084 B2 | 11/2011 | Schulz et al. |
| 8,091,928 B2 | 1/2012 | Carrier et al. |
| 8,096,354 B2 | 1/2012 | Poitzsch |

(56) References Cited

U.S. PATENT DOCUMENTS

| | | |
|---|---|---|
| 8,096,891 B2 | 1/2012 | Lochtefeld et al. |
| 8,139,383 B2 | 3/2012 | Efraimsson et al. |
| 8,146,665 B2 | 4/2012 | Neal |
| 8,154,419 B2 | 4/2012 | Daussin et al. |
| 8,232,892 B2 | 7/2012 | Overholt et al. |
| 8,261,528 B2 | 9/2012 | Chillar et al. |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria et al. |
| 8,506,267 B2 | 8/2013 | Gambier et al. |
| 8,534,232 B2 | 9/2013 | Chandler |
| 8,573,303 B2 | 11/2013 | Kerfoot |
| 8,596,056 B2 | 12/2013 | Woodmansee et al. |
| 8,616,005 B1 | 12/2013 | Cousino, Sr. |
| 8,616,274 B2 | 12/2013 | Belcher et al. |
| 8,646,521 B2 | 2/2014 | Bowen |
| 8,692,408 B2 | 4/2014 | Zhang et al. |
| 8,727,068 B2 | 5/2014 | Bruin |
| 8,760,657 B2 | 6/2014 | Pope et al. |
| 8,763,387 B2 | 7/2014 | Schmidt |
| 8,774,972 B2 | 7/2014 | Rusnak et al. |
| 8,789,601 B2 * | 7/2014 | Broussard .............. E21B 43/26 166/308.1 |
| 8,795,525 B2 | 8/2014 | Mcginnis et al. |
| 8,800,652 B2 | 8/2014 | Bartko et al. |
| 8,807,960 B2 | 8/2014 | Stephenson et al. |
| 8,838,341 B2 | 9/2014 | Kumano |
| 8,851,860 B1 | 10/2014 | Mail |
| 8,857,506 B2 | 10/2014 | Stone, Jr. et al. |
| 8,899,940 B2 | 12/2014 | Leugemors et al. |
| 8,905,056 B2 | 12/2014 | Kendrick |
| 8,905,138 B2 | 12/2014 | Lundstedt et al. |
| 8,997,904 B2 | 4/2015 | Cryer et al. |
| 9,018,881 B2 | 4/2015 | Mao et al. |
| 9,051,822 B2 | 6/2015 | Ayan et al. |
| 9,051,923 B2 | 6/2015 | Kuo |
| 9,061,223 B2 | 6/2015 | Winborn |
| 9,062,545 B2 | 6/2015 | Roberts et al. |
| 9,067,182 B2 | 6/2015 | Nichols et al. |
| 9,103,193 B2 | 8/2015 | Coli et al. |
| 9,119,326 B2 | 8/2015 | McDonnell et al. |
| 9,121,257 B2 | 9/2015 | Coli et al. |
| 9,140,105 B2 | 9/2015 | Pattillo |
| 9,140,110 B2 | 9/2015 | Coli et al. |
| 9,160,168 B2 | 10/2015 | Chapel et al. |
| 9,175,554 B1 | 11/2015 | Watson |
| 9,206,684 B2 | 12/2015 | Parra et al. |
| 9,260,253 B2 | 2/2016 | Naizer et al. |
| 9,322,239 B2 | 4/2016 | Angeles Boza et al. |
| 9,324,049 B2 | 4/2016 | Thomeer et al. |
| 9,340,353 B2 | 5/2016 | Oren et al. |
| 9,353,593 B1 | 5/2016 | Lu et al. |
| 9,366,114 B2 | 6/2016 | Coli et al. |
| 9,410,410 B2 * | 8/2016 | Broussard .............. F01D 15/10 |
| 9,450,385 B2 | 9/2016 | Kristensen |
| 9,458,687 B2 | 10/2016 | Hallundbaek |
| 9,475,020 B2 | 10/2016 | Coli et al. |
| 9,475,021 B2 | 10/2016 | Coli et al. |
| 9,482,086 B2 | 11/2016 | Richardson et al. |
| 9,499,335 B2 | 11/2016 | McIver et al. |
| 9,506,333 B2 | 11/2016 | Castillo et al. |
| 9,513,055 B1 | 12/2016 | Seal |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,706,185 B2 | 7/2017 | Ellis |
| 9,728,354 B2 | 8/2017 | Skolozdra et al. |
| 9,738,461 B2 | 8/2017 | Degaray et al. |
| 9,739,546 B2 | 8/2017 | Bertilsson et al. |
| 9,745,840 B2 | 8/2017 | Oehring et al. |
| 9,790,858 B2 | 10/2017 | Kanebako |
| 9,840,901 B2 | 12/2017 | Oehring et al. |
| 9,863,228 B2 | 1/2018 | Shampine et al. |
| 9,893,500 B2 | 2/2018 | Oehring et al. |
| 9,909,398 B2 | 3/2018 | Pham |
| 9,915,128 B2 | 3/2018 | Hunter |
| 9,932,799 B2 | 4/2018 | Symchuk |
| 9,945,365 B2 | 4/2018 | Hernandez et al. |
| 9,963,961 B2 | 5/2018 | Hardin |
| 9,970,278 B2 | 5/2018 | Broussard et al. |
| 9,976,351 B2 | 5/2018 | Randall |
| 9,995,218 B2 | 6/2018 | Oehring et al. |
| 10,008,880 B2 | 6/2018 | Vicknair et al. |
| 10,020,711 B2 | 7/2018 | Oehring et al. |
| 10,036,238 B2 | 7/2018 | Oehring |
| 10,107,086 B2 | 10/2018 | Oehring et al. |
| 10,119,381 B2 | 11/2018 | Oehring et al. |
| 10,184,465 B2 | 1/2019 | Enis et al. |
| 10,196,878 B2 | 2/2019 | Hunter |
| 10,221,639 B2 | 3/2019 | Romer et al. |
| 10,227,854 B2 | 3/2019 | Glass |
| 10,232,332 B2 | 3/2019 | Oehring et al. |
| 10,246,984 B2 | 4/2019 | Payne et al. |
| 10,254,732 B2 | 4/2019 | Oehring et al. |
| 10,260,327 B2 | 4/2019 | Kajaria et al. |
| 10,280,724 B2 | 5/2019 | Hinderliter |
| 10,287,873 B2 | 5/2019 | Filas et al. |
| 10,302,079 B2 | 5/2019 | Kendrick |
| 10,309,205 B2 | 6/2019 | Randall |
| 10,337,308 B2 * | 7/2019 | Broussard .............. F02C 3/22 |
| 10,371,012 B2 | 8/2019 | Davis et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,030 B2 | 9/2019 | Oehring et al. |
| 10,408,031 B2 | 9/2019 | Oehring et al. |
| 10,415,332 B2 | 9/2019 | Morris et al. |
| 10,436,026 B2 | 10/2019 | Ounadjela et al. |
| 10,627,003 B2 | 4/2020 | Dale et al. |
| 10,648,270 B2 | 5/2020 | Brunty et al. |
| 10,669,471 B2 | 6/2020 | Schmidt et al. |
| 10,669,804 B2 | 6/2020 | Kotrla et al. |
| 10,686,301 B2 | 6/2020 | Oehring et al. |
| 10,695,950 B2 | 6/2020 | Igo et al. |
| 10,711,576 B2 | 7/2020 | Bishop |
| 10,731,561 B2 | 8/2020 | Oehring et al. |
| 10,740,730 B2 | 8/2020 | Altamirano et al. |
| 10,767,561 B2 | 9/2020 | Brady |
| 10,781,752 B2 | 9/2020 | Kikkawa et al. |
| 10,988,998 B2 | 4/2021 | Fischer et al. |
| 11,136,870 B2 * | 10/2021 | Broussard ............ E21B 43/267 |
| 11,449,018 B2 * | 9/2022 | Oehring ................. E21B 43/26 |
| 2001/0000996 A1 | 5/2001 | Grimland et al. |
| 2002/0169523 A1 | 11/2002 | Ross et al. |
| 2003/0056514 A1 | 3/2003 | Lohn |
| 2003/0079875 A1 | 5/2003 | Weng |
| 2003/0138327 A1 | 7/2003 | Jones et al. |
| 2004/0040746 A1 | 3/2004 | Niedermayr et al. |
| 2004/0045703 A1 | 3/2004 | Hooper et al. |
| 2004/0102109 A1 | 5/2004 | Cratty et al. |
| 2004/0167738 A1 | 8/2004 | Miller |
| 2005/0061548 A1 | 3/2005 | Hooper et al. |
| 2005/0116541 A1 | 6/2005 | Seiver |
| 2005/0201197 A1 | 9/2005 | Duell et al. |
| 2005/0274508 A1 | 12/2005 | Folk et al. |
| 2006/0052903 A1 | 3/2006 | Bassett |
| 2006/0065319 A1 | 3/2006 | Csitari |
| 2006/0109141 A1 | 5/2006 | Huang et al. |
| 2006/0260331 A1 | 11/2006 | Andreychuk |
| 2007/0125544 A1 | 6/2007 | Robinson et al. |
| 2007/0131410 A1 | 6/2007 | Hill et al. |
| 2007/0187163 A1 | 8/2007 | Cone et al. |
| 2007/0201305 A1 | 8/2007 | Heilman et al. |
| 2007/0226089 A1 | 9/2007 | Degaray et al. |
| 2007/0277982 A1 | 12/2007 | Shampine et al. |
| 2007/0278140 A1 | 12/2007 | Mallett et al. |
| 2008/0017369 A1 | 1/2008 | Sarada |
| 2008/0041596 A1 | 2/2008 | Blount et al. |
| 2008/0095644 A1 | 4/2008 | Mantei et al. |
| 2008/0112802 A1 | 5/2008 | Orlando et al. |

(56) References Cited

U.S. PATENT DOCUMENTS

| | | |
|---|---|---|
| 2008/0137266 A1 | 6/2008 | Jensen et al. |
| 2008/0164023 A1 | 7/2008 | Dykstra et al. |
| 2008/0208478 A1 | 8/2008 | Ella et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0264625 A1 | 10/2008 | Ochoa |
| 2008/0264640 A1 | 10/2008 | Eslinger |
| 2008/0264649 A1 | 10/2008 | Crawford |
| 2008/0277120 A1 | 11/2008 | Hickie |
| 2009/0045782 A1 | 2/2009 | Datta et al. |
| 2009/0065299 A1 | 3/2009 | Vito et al. |
| 2009/0078410 A1 | 3/2009 | Krenek et al. |
| 2009/0090504 A1 | 4/2009 | Weightman et al. |
| 2009/0093317 A1 | 4/2009 | Kajiwara et al. |
| 2009/0095482 A1 | 4/2009 | Surjaatmadja |
| 2009/0145611 A1 | 6/2009 | Pallini, Jr. et al. |
| 2009/0153354 A1 | 6/2009 | Duassin et al. |
| 2009/0188181 A1 | 7/2009 | Forbis et al. |
| 2009/0200035 A1 | 8/2009 | Bjerkreim et al. |
| 2009/0260826 A1 | 10/2009 | Sherwood et al. |
| 2009/0308602 A1 | 12/2009 | Bruins et al. |
| 2010/0000508 A1 | 1/2010 | Chandler |
| 2010/0019574 A1 | 1/2010 | Baldassarre et al. |
| 2010/0038907 A1 | 2/2010 | Hunt et al. |
| 2010/0045109 A1 | 2/2010 | Arnold |
| 2010/0051272 A1 | 3/2010 | Loree et al. |
| 2010/0101785 A1 | 4/2010 | Khvoshchev et al. |
| 2010/0132949 A1 | 6/2010 | Defosse et al. |
| 2010/0146981 A1 | 6/2010 | Motakef et al. |
| 2010/0172202 A1 | 7/2010 | Borgstadt |
| 2010/0200224 A1 | 8/2010 | Nguete et al. |
| 2010/0250139 A1 | 9/2010 | Hobbs et al. |
| 2010/0293973 A1 | 11/2010 | Erickson |
| 2010/0303655 A1 | 12/2010 | Scekic |
| 2010/0312415 A1 | 12/2010 | Loucks |
| 2010/0322802 A1 | 12/2010 | Kugelev |
| 2011/0005757 A1 | 1/2011 | Herbert |
| 2011/0017468 A1 | 1/2011 | Birch et al. |
| 2011/0052423 A1 | 3/2011 | Gambier et al. |
| 2011/0061855 A1 | 3/2011 | Case et al. |
| 2011/0085924 A1 | 3/2011 | Shampine et al. |
| 2011/0081268 A1 | 4/2011 | Ochoa et al. |
| 2011/0110793 A1 | 5/2011 | Leugemors et al. |
| 2011/0166046 A1 | 7/2011 | Weaver et al. |
| 2011/0197988 A1 | 8/2011 | Van Vliet et al. |
| 2011/0241590 A1 | 10/2011 | Horikoshi et al. |
| 2011/0247878 A1 | 10/2011 | Rasheed et al. |
| 2011/0272158 A1 | 11/2011 | Neal |
| 2012/0018016 A1 | 1/2012 | Gibson et al. |
| 2012/0049625 A1 | 3/2012 | Hopwood |
| 2012/0063936 A1 | 3/2012 | Baxter et al. |
| 2012/0085541 A1 | 4/2012 | Love et al. |
| 2012/0112757 A1 | 5/2012 | Vrankovic et al. |
| 2012/0127635 A1 | 5/2012 | Grindeland |
| 2012/0150455 A1 | 6/2012 | Franklin et al. |
| 2012/0152716 A1 | 6/2012 | Kikukawa et al. |
| 2012/0205301 A1 | 8/2012 | McGuire et al. |
| 2012/0205400 A1 | 8/2012 | Degaray et al. |
| 2012/0222865 A1 | 9/2012 | Larson et al. |
| 2012/0232728 A1 | 9/2012 | Karimi et al. |
| 2012/0247783 A1 | 10/2012 | Berner, Jr. et al. |
| 2012/0255734 A1 | 10/2012 | Coli et al. |
| 2013/0009469 A1 | 1/2013 | Gillett |
| 2013/0025706 A1 | 1/2013 | Degaray et al. |
| 2013/0051971 A1 | 2/2013 | Wyse et al. |
| 2013/0118750 A1 | 5/2013 | Gu et al. |
| 2013/0175038 A1 | 7/2013 | Conrad |
| 2013/0175039 A1 | 7/2013 | Guidry |
| 2013/0180722 A1 | 7/2013 | Olarte Caro |
| 2013/0189629 A1 | 7/2013 | Chandler |
| 2013/0199617 A1 | 8/2013 | Degaray et al. |
| 2013/0233542 A1 | 9/2013 | Shampine et al. |
| 2013/0255271 A1 | 10/2013 | Yu et al. |
| 2013/0284278 A1 | 10/2013 | Winborn |
| 2013/0284455 A1 | 10/2013 | Kajaria et al. |
| 2013/0299167 A1 | 11/2013 | Fordyce et al. |
| 2013/0306322 A1 | 11/2013 | Sanborn et al. |
| 2013/0317750 A1 | 11/2013 | Hunter |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0011067 A1 | 1/2014 | Cryer et al. |
| 2014/0054965 A1 | 2/2014 | Jain |
| 2014/0060658 A1 | 3/2014 | Hains et al. |
| 2014/0095114 A1 | 4/2014 | Thomeer et al. |
| 2014/0096974 A1 | 4/2014 | Coli et al. |
| 2014/0124162 A1 | 5/2014 | Leavitt |
| 2014/0138079 A1 | 5/2014 | Broussard et al. |
| 2014/0174717 A1 | 6/2014 | Broussard et al. |
| 2014/0219824 A1 | 8/2014 | Burnette |
| 2014/0238683 A1 | 8/2014 | Korach et al. |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0277772 A1 | 9/2014 | Lopez et al. |
| 2014/0290768 A1 | 10/2014 | Randle et al. |
| 2014/0379300 A1 | 12/2014 | Devine et al. |
| 2015/0027712 A1 | 1/2015 | Vicknair et al. |
| 2015/0053426 A1 | 2/2015 | Smith et al. |
| 2015/0068724 A1 | 3/2015 | Coli et al. |
| 2015/0068754 A1 | 3/2015 | Coli et al. |
| 2015/0075778 A1 | 3/2015 | Walters et al. |
| 2015/0083426 A1 | 3/2015 | Lesko et al. |
| 2015/0097504 A1 | 4/2015 | Lamascus et al. |
| 2015/0114652 A1 | 4/2015 | Lestz et al. |
| 2015/0136043 A1 | 5/2015 | Shaaban et al. |
| 2015/0144336 A1 | 5/2015 | Hardin et al. |
| 2015/0147194 A1 | 5/2015 | Foote |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman et al. |
| 2015/0211524 A1 | 7/2015 | Broussard et al. |
| 2015/0217672 A1 | 8/2015 | Shampine et al. |
| 2015/0225113 A1 | 8/2015 | Lungu et al. |
| 2015/0233530 A1 | 8/2015 | Sandidge |
| 2015/0252661 A1 | 9/2015 | Glass |
| 2015/0300145 A1 | 10/2015 | Coli et al. |
| 2015/0300336 A1 | 10/2015 | Hernandez et al. |
| 2015/0314225 A1 | 11/2015 | Parsons et al. |
| 2015/0330172 A1 | 11/2015 | Allmaras et al. |
| 2015/0354322 A1 | 12/2015 | Vicknair et al. |
| 2016/0032703 A1 | 2/2016 | Broussard et al. |
| 2016/0102537 A1 | 4/2016 | Lopez |
| 2016/0105022 A1 | 4/2016 | Oehring et al. |
| 2016/0160889 A1 | 6/2016 | Hoffman et al. |
| 2016/0177675 A1 | 6/2016 | Morris et al. |
| 2016/0177678 A1 | 6/2016 | Morris et al. |
| 2016/0186531 A1 | 6/2016 | Harkless et al. |
| 2016/0208592 A1 | 7/2016 | Oehring |
| 2016/0208593 A1 | 7/2016 | Coli et al. |
| 2016/0208594 A1 | 7/2016 | Coli et al. |
| 2016/0208595 A1 | 7/2016 | Tang et al. |
| 2016/0221220 A1 | 8/2016 | Paige |
| 2016/0230524 A1 | 8/2016 | Dumoit et al. |
| 2016/0230525 A1 | 8/2016 | Lestz et al. |
| 2016/0230660 A1 | 8/2016 | Zeitoun et al. |
| 2016/0258267 A1 | 9/2016 | Payne et al. |
| 2016/0265457 A1 | 9/2016 | Stephenson et al. |
| 2016/0273328 A1 | 9/2016 | Oehring |
| 2016/0273456 A1 | 9/2016 | Zhang |
| 2016/0281484 A1 | 9/2016 | Lestz et al. |
| 2016/0290114 A1 | 10/2016 | Oehring et al. |
| 2016/0290563 A1 | 10/2016 | Diggins |
| 2016/0312108 A1 | 10/2016 | Lestz et al. |
| 2016/0319650 A1 | 11/2016 | Oehring et al. |
| 2016/0326853 A1 | 11/2016 | Fredd et al. |
| 2016/0326854 A1 | 11/2016 | Broussard et al. |
| 2016/0326855 A1 | 11/2016 | Coli et al. |
| 2016/0341281 A1 | 11/2016 | Brunvold et al. |
| 2016/0348479 A1 | 12/2016 | Oehring et al. |
| 2016/0349728 A1 | 12/2016 | Oehring et al. |

(56) References Cited

U.S. PATENT DOCUMENTS

| | | |
|---|---|---|
| 2016/0369609 A1 | 12/2016 | Morris et al. |
| 2017/0016433 A1 | 1/2017 | Chong et al. |
| 2017/0021318 A1 | 1/2017 | Mciver |
| 2017/0022788 A1 | 1/2017 | Oehring et al. |
| 2017/0022807 A1 | 1/2017 | Dursun et al. |
| 2017/0028368 A1 | 2/2017 | Oehring et al. |
| 2017/0030177 A1 | 2/2017 | Oehring et al. |
| 2017/0030178 A1 | 2/2017 | Oehring et al. |
| 2017/0036178 A1 | 2/2017 | Coli et al. |
| 2017/0036872 A1 | 2/2017 | Wallace |
| 2017/0037717 A1 | 2/2017 | Oehring et al. |
| 2017/0037718 A1 | 2/2017 | Coli et al. |
| 2017/0043280 A1 | 2/2017 | Vankouwenberg |
| 2017/0051732 A1 | 2/2017 | Hernandez et al. |
| 2017/0074076 A1 | 3/2017 | Joseph et al. |
| 2017/0082033 A1 | 3/2017 | Wu et al. |
| 2017/0096885 A1 | 4/2017 | Oehring et al. |
| 2017/0096889 A1 | 4/2017 | Blanckaert et al. |
| 2017/0104389 A1 | 4/2017 | Morris et al. |
| 2017/0114625 A1 | 4/2017 | Norris et al. |
| 2017/0130743 A1 | 5/2017 | Anderson |
| 2017/0138171 A1 | 5/2017 | Richards et al. |
| 2017/0145918 A1 | 5/2017 | Oehring et al. |
| 2017/0146189 A1 | 5/2017 | Herman et al. |
| 2017/0159570 A1 | 6/2017 | Bickert |
| 2017/0159654 A1 | 6/2017 | Kendrick |
| 2017/0175516 A1 | 6/2017 | Eslinger |
| 2017/0204852 A1 | 7/2017 | Barnett, Jr. |
| 2017/0212535 A1 | 7/2017 | Shelman et al. |
| 2017/0218727 A1 | 8/2017 | Oehring et al. |
| 2017/0218843 A1 | 8/2017 | Oehring et al. |
| 2017/0222409 A1 | 8/2017 | Oehring et al. |
| 2017/0226838 A1 | 8/2017 | Ciezobka et al. |
| 2017/0226839 A1 | 8/2017 | Broussard et al. |
| 2017/0226842 A1 | 8/2017 | Omont et al. |
| 2017/0234250 A1 | 8/2017 | Janik |
| 2017/0241221 A1 | 8/2017 | Seshadri et al. |
| 2017/0259227 A1 | 9/2017 | Morris et al. |
| 2017/0292513 A1 | 10/2017 | Haddad et al. |
| 2017/0313499 A1 | 11/2017 | Hughes et al. |
| 2017/0314380 A1 | 11/2017 | Oehring et al. |
| 2017/0314979 A1 | 11/2017 | Ye et al. |
| 2017/0328179 A1 | 11/2017 | Dykstra et al. |
| 2017/0369258 A1 | 12/2017 | Degaray et al. |
| 2017/0370639 A1 | 12/2017 | Bardon et al. |
| 2018/0028992 A1 | 2/2018 | Stegemoeller et al. |
| 2018/0038216 A1 | 2/2018 | Zhang et al. |
| 2018/0045331 A1 | 2/2018 | Lopez et al. |
| 2018/0090914 A1 | 3/2018 | Johnson et al. |
| 2018/0156210 A1 | 6/2018 | Oehring et al. |
| 2018/0181830 A1 | 6/2018 | Luharuka et al. |
| 2018/0183219 A1 | 6/2018 | Oehring et al. |
| 2018/0216455 A1 | 8/2018 | Andreychuk et al. |
| 2018/0238147 A1 | 8/2018 | Shahri et al. |
| 2018/0245428 A1 | 8/2018 | Richards |
| 2018/0258746 A1 | 9/2018 | Broussard et al. |
| 2018/0259080 A1 | 9/2018 | Dale et al. |
| 2018/0266217 A1 | 9/2018 | Funkhouser et al. |
| 2018/0266412 A1 | 9/2018 | Stokkevåg et al. |
| 2018/0274446 A1 | 9/2018 | Oehring et al. |
| 2018/0284817 A1 | 10/2018 | Cook et al. |
| 2018/0291713 A1 | 10/2018 | Jeanson |
| 2018/0298731 A1 | 10/2018 | Bishop et al. |
| 2018/0312738 A1 | 11/2018 | Rutsch et al. |
| 2018/0313677 A1 | 11/2018 | Warren et al. |
| 2018/0320483 A1 | 11/2018 | Zhang et al. |
| 2018/0343125 A1 | 11/2018 | Clish et al. |
| 2018/0363437 A1 | 12/2018 | Coli et al. |
| 2018/0366950 A1 | 12/2018 | Pedersen et al. |
| 2019/0003329 A1 | 1/2019 | Morris et al. |
| 2019/0010793 A1 | 1/2019 | Hinderliter |
| 2019/0040727 A1 | 2/2019 | Oehring et al. |
| 2019/0063309 A1 | 2/2019 | Davis |
| 2019/0100989 A1 | 4/2019 | Stewart et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0128080 A1 | 5/2019 | Ross et al. |
| 2019/0128104 A1 | 5/2019 | Graham et al. |
| 2019/0145251 A1 | 5/2019 | Johnson |
| 2019/0154020 A1 | 5/2019 | Glass |
| 2019/0162061 A1 | 5/2019 | Stephenson |
| 2019/0169971 A1 | 6/2019 | Oehring et al. |
| 2019/0178057 A1 | 6/2019 | Hunter |
| 2019/0178235 A1 | 6/2019 | Coskrey et al. |
| 2019/0203567 A1 | 7/2019 | Ross et al. |
| 2019/0203572 A1 | 7/2019 | Morris et al. |
| 2019/0211661 A1 | 7/2019 | Reckels et al. |
| 2019/0226317 A1 | 7/2019 | Payne et al. |
| 2019/0245348 A1 | 8/2019 | Hinderliter et al. |
| 2019/0249527 A1 | 8/2019 | Kraynek |
| 2019/0257462 A1 | 8/2019 | Rogers |
| 2019/0292866 A1 | 9/2019 | Ross et al. |
| 2019/0292891 A1 | 9/2019 | Kajaria |
| 2019/0316447 A1 | 10/2019 | Oehring et al. |
| 2020/0040878 A1 | 2/2020 | Morris |
| 2020/0047141 A1 | 2/2020 | Oehring et al. |
| 2020/0088152 A1 | 3/2020 | Alloin |
| 2020/0232454 A1 | 7/2020 | Chretien et al. |
| 2020/0325760 A1 | 10/2020 | Markham |
| 2020/0350790 A1 | 12/2020 | Luft et al. |
| 2024/0287885 A1* | 8/2024 | Broussard ............... H02P 23/00 |

FOREIGN PATENT DOCUMENTS

| | | |
|---|---|---|
| CA | 2707269 | 12/2010 |
| CA | 2482943 | 5/2011 |
| CA | 3050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 3067854 | 1/2019 |
| CA | 2919649 | 2/2019 |
| CA | 2919666 | 7/2019 |
| CA | 2797081 | 9/2019 |
| CA | 2945579 | 10/2019 |
| CN | 201687513 | 12/2010 |
| CN | 101977016 | 2/2011 |
| CN | 202023547 | 11/2011 |
| CN | 102602322 | 7/2012 |
| CN | 104117308 | 10/2014 |
| CN | 104196613 | 12/2014 |
| CN | 205986303 | 2/2017 |
| CN | 108049999 | 5/2018 |
| CN | 112196508 | 1/2021 |
| EP | 1900973 | 6/2010 |
| JP | 2004264589 | 9/2004 |
| WO | 2009046280 | 4/2009 |
| WO | 2014177346 | 11/2014 |
| WO | 2016144939 | 9/2016 |
| WO | 2016160458 | 10/2016 |
| WO | 2018044307 | 3/2018 |
| WO | 2018213925 | 11/2018 |
| WO | 2019210417 | 11/2019 |

OTHER PUBLICATIONS

International Search Report and Written Opinion mailed Jan. 2, 2019 in related PCT Patent Application No. PCT/US18/54548.
International Search Report and Written Opinion mailed Jan. 2, 2020 in related PCT Application No. PCT/US19/55325.
International Search Report and Written Opinion mailed Jan. 4, 2019 in related PCT Patent Application No. PCT/US18/57539.
International Search Report and Written Opinion mailed Jul. 22, 2020 in corresponding PCT Application No. PCT/US20/00017.

(56) References Cited

OTHER PUBLICATIONS

International Search Report and Written Opinion mailed Jul. 9, 2019 in corresponding PCT Application No. PCT/US2019/027584.
International Search Report and Written Opinion mailed Jul. 9, 2019 in corresponding PCT/US2019/027584.
International Search Report and Written Opinion mailed Jun. 23, 2020 in corresponding PCT Application No. PCT/US20/23912.
International Search Report and Written Opinion mailed Mar. 5, 2019 in related PCT Application No. PCT/US18/63970.
International Search Report and Written Opinion mailed Nov. 26, 2019 in related PCT Application No. PCT/US19/51018.
International Search Report and Written Opinion mailed Sep. 11, 2019 in related PCT Application No. PCT/US2019/037493.
International Search Report and Written Opinion Mailed Sep. 3, 2020 in PCT/US2020/36932.
Karin, "Duel Fuel Diesel Engines," (2015), Taylor & Francis, pp. 62-63, Retrieved from https://app.knovel.com/hotlink/toc/id:kpDFDE0001/dual-fueal-diesel-engines/duel-fuel-diesel-engines (Year 2015).
Kroposki et al., Making Microgrids Work, 6 IEEE Power and Energy Mag. 40, 41 (2008).
Luis Gamboa, "Variable Frequency Drives in Oil and Gas Pumping Systems", Dec. 17, 2011, 5 pages.
Morris et al., U.S. Appl. No. 62/526.869; Hydration-Blender Transport and Electric Power Distribution for Fracturing Operation; Jun. 28, 2018; USPTO; see entire document.
Non- Final Office Action issued in corresponding U.S. Appl. No. 14/622,532 dated May 17, 2016.
Non-Final Action issued in corresponding U.S. Appl. No. 15/293,681 dated Feb. 16, 2017.
Non-Final Office Action dated Mar. 3, 2020 corresponding to U.S. Appl. No. 16/152,695.
Non-Final Office Action dated Oct. 4, 2018 in related U.S. Appl. No. 15/217,081.
Non-Final Office Action issue din corresponding U.S. Appl. No. 15/291,842 dated Jan. 6, 2017.
Non-Final Office Action issued in corresponding U.S. Appl. No. 14/622,532 dated Aug. 5, 2015.
Non-Final Office Action issued in corresponding U.S. Appl. No. 14/884,363 dated Sep. 5, 2017.
Non-Final Office Action issued in corresponding U.S. Appl. No. 15/145,443 dated Feb. 7, 2017.
Non-Final Office Action issued in Corresponding U.S. Appl. No. 15/145,491 on May 15, 2017.
Non-Final Office Action issued in corresponding U.S. Appl. No. 15/145,491 on Sep. 12, 2016.
Non-Final Office Action issued in corresponding U.S. Appl. No. 15/217,040 dated Nov. 29, 2016.
Non-Final Office Action issued in corresponding U.S. Appl. No. 15/235,788 dated Dec. 14, 2016.
Non-Final Office Action issued in corresponding U.S. Appl. No. 15/294,349 dated Mar. 14, 2017.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Non-Final Office Action issued in corresponding U.S. Appl. No. 16/170,695 dated Jun. 7, 2019.
Non-Final Office Action issued in corresponding U.S. Appl. No. 16/268,030 dated May 10, 2019.
Non-Final Office Action issued in U.S. Appl. No. 16/901,774 mailed Sep. 14, 2021.
Non-Final Office Action issued in U.S. Appl. No. 17/060,647 mailed Sep. 20, 2021.
Non-Final Office Action issued in U.S. Appl. No. 14/881,535 mailed May 20, 2020.
Non-Final Office Action issued in U.S. Appl. No. 15/145,443 mailed May 8, 2020.
Non-Final Office Action issued in U.S. Appl. No. 16/458,696 mailed May 22, 2020.
Non-Final Office Action issued in U.S. Appl. No. 16/564,186, mailed Oct. 15, 2021.
Non-Final Office Action issued in U.S. Appl. No. 16/871,328 mailed Dec. 9, 2021.
Non-Final Office Action issued in U.S. Appl. No. 16/943,935 mailed Oct. 21, 2021.
Non-Final Office Action issued Nov. 13, 2017 in related U.S. Appl. No. 15/644,487.
Non-Final Office Action issued Nov. 29, 2017 in related U.S. Appl. No. 15/145,414.
Non-Final Office Action issued Oct. 6, 2017 in related U.S. Appl. No. 14/881,535.
Non-Final Office action Mailed Aug. 31, 2020 in U.S. Appl. No. 16/167,083.
Non-Final Office Action mailed Dec. 23, 2019 in related U.S. Appl. No. 16/597,008.
Non-Final Office Action mailed Dec. 6, 2019 in related U.S. Appl. No. 16/564,186.
Non-final Office Action mailed Feb. 12, 2019 in related U.S. Appl. No. 16/170,695.
Non-Final Office Action mailed Feb. 25, 2019 in related U.S. Appl. No. 16/210,749.
"Griswold Model 811 Pumps: Installation, Operation and Maintenance Manual, ANSI Process Pump", 2010, 60 pages.
"Heat Exchanger" (https://en.wikipedia.org/w/index.php?title=Heat_exchanger&oldid=89300146) Dec. 18, 2019 Apr. 2019 (1Apr. 18, 2019), entire document, especially para (0001].
"Process Burner" (https://www.cebasrt.com/productsloii-gaslprocess-burner) 06 Sep. 6, 2018 (Sep. 6, 2018), entire document, especially para (Burners for refinery Heaters).
Water and Glycol Heating Systems (https://www.heat-inc.com/wg-series-water-glycol-systems/) Jun. 18, 2018 (Jun. 18, 2018), entire document, especially WG Series Water Glycol Systems.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action dated Apr. 18, 2018 in related Canadian Patent Application No. 2,298,711.
Canadian Office Action dated Jun. 22, 2018 in related Canadian Patent Application No. 2,886,697.
Canadian Office Action dated Mar. 2, 2018 in related Canadian Patent Application No. 2,833,711.
Canadian Office Action dated Sep. 28, 2018 in related Canadian Patent Application No. 2,945,281.
Canadian Office Action issued Aug. 31, 2020 in Candian Patent Application No. 2,944,980.
Canadian Office Action issued in Canadian Application No. 3,094,768 mailed Oct. 28, 2021.
Canadian Office Action issued Sep. 22, 2020 in Canadian Application No. 2,982,974.
Canadian Office Action issued Sep. 8, 2020 in Candian Patent Application No. 2,928,707.
Canadian Office Action mailed Aug. 17, 2020 in related CA Patent Application No. 2,944,968.
Canadian Office Action mailed Aug. 18, 2020 in related CA Patent Application No. 2,933,444.
Canadian Office Action mailed Jun. 20, 2019 in corresponding CA Application No. 2,964,597.
Canadian Office Action mailed May 30, 2019 in corresponding CA Application No. 2,833,711.
Canadian Office Action mailed Oct. 1, 2019 in related Canadian Patent Application No. 2,936,997.
Dan T. Ton & Merrill A. Smith, The U.S. Department of Energy's Microgrid Initiative, 25 The Electricity J. 84 (2012), pp. 84-94.
Final Office Action dated Mar. 31, 2020 corresponding to U.S. Appl. No. 15/356,436.
Final Office Action issued corresponding U.S. Appl. No. 16/210,749 dated Jun. 11, 2019.
Final Office Action issued in corresponding U.S. Appl. No. 14/622,532 dated Dec. 21, 2015.

(56) References Cited

OTHER PUBLICATIONS

Final Office Action issued in corresponding U.S. Appl. No. 14/622,532 dated Dec. 7, 2016.
Final Office Action issued in corresponding U.S. Appl. No. 15/145,491 dated Jan. 20, 2017.
Final Office Action issued in corresponding U.S. Appl. No. 15/145,491 dated Sep. 6, 2017.
Final Office Action issued in corresponding U.S. Appl. No. 15/294,349 dated Jul. 6, 2017,.
Final Office Action issued in U.S. Appl. No. 16/356,263 mailed Oct. 7, 2021.
Final Office Action mailed Feb. 4, 2021 in U.S. Appl. No. 16/597,014.
Final Office Action mailed Jan. 11, 2021 in U.S. Appl. No. 16/404,283.
Final Office Action mailed Jan. 21, 2021 in U.S. Appl. No. 16/458,696.
Goodwin, "High-voltage auxiliary switchgear for power stations," Power Engineering Journal, 1989, 10 pg. (Year 1989).
International Search and Report and Written Opinion mailed Jan. 2, 2019 in related PCT Patent Application No. PCT/US18/54542.
International Search and Written Opinion Mailed Aug. 28, 2020 in PCT/US20/23821.
International Search report and Written Opinion dated Sep. 19, 2018 in related PCT Patent Application No. PCT/US2018/040683.
International Search Report and Written Opinion issued in PCT/US2020/023809 mailed Jun. 2, 2020.
International Search Report and Written Opinion mailed Apr. 10, 2019 in corresponding PCT Application No. PCT/US2019/016635.
International Search Report and Written Opinion mailed Dec. 14, 2020 in PCT/US2020/53980.
International Search Report and Written Opinion mailed Dec. 31, 2018 in related PCT Patent Application No. PCT/US18/55913.
International Search Report and Written Opinion mailed Feb. 11, 2020 in related PCT Application No. PCT/US2019/055323.
International Search Report and Written Opinion mailed Feb. 15, 2019 in related PCT Application No. PCT/US18/63977.
International Search Report and Written Opinion mailed Feb. 2, 2021 in PCT/US20/58906.
International Search Report and Written Opinion mailed Feb. 3, 2021 in PCT/US20/58899.
International Search Report and Written Opinion mailed Feb. 4, 2021 in PCT/US20/59834.
International Search Report and Written Opinion mailed in PCT/US/67526 mailed May 6, 2021.
International Search Report and Written Opinion mailed in PCT/US20/67146 mailed Mar. 29, 2021.
International Search Report and Written Opinion mailed in PCT/US20/67523 mailed Mar. 22, 2021.
International Search Report and Written Opinion mailed in PCT/US20/67528 mailed Mar. 19, 2021.
International Search Report and Written Opinion mailed in PCT/US20/67608 mailed Mar. 30, 2021.
Non-Final Office Action mailed Jan. 10, 2020 in related U.S. Appl. No. 16/597,014.
Non-Final Office Action mailed Jan. 29, 2021 in U.S. Appl. No. 16/564,185.
Non-Final Office Action mailed Jan. 4, 2021 in U.S. Appl. No. 16/522,043.
Non-Final Office Action mailed Mar. 6, 2019 in related U.S. Appl. No. 15/183,387.
Non-Final Office Action Mailed Sep. 2, 2020 in U.S. Appl. No. 16/356,263.
Non-Final Office Action Mailed Sep. 29, 2020 in U.S. Appl. No. 16/943,727.
Non-Final Office Mailed Oct. 2, 2020 in U.S. Appl. No. 16/443,273.
Non-Final Office Mailed Oct. 26, 2020 in U.S. Appl. No. 15/356,436.
Notice of Allowance issued in corresponding U.S. Appl. No. 14/622,532 dated Mar. 27, 2017.
Notice of Allowance issued in corresponding U.S. Appl. No. 15/217,040 dated Mar. 28, 2017.
Notice Of Allowance mailed Apr. 23, 2019 in corresponding U.S. Appl. No. 15/635,028.
Notice of Allowance mailed Jan. 9, 2020 in related U.S. Appl. No. 16/570,331.
Office Action dated Apr. 10, 2018 in related U.S. Appl. No. 15/294,349.
Office Action dated Apr. 2, 2018 in related U.S. Appl. No. 15/183,387.
Office Action dated Jul. 25, 2018 in related U.S. Appl. No. 15/644,487.
Office Action dated May 29, 2018 in related U.S. Appl. No. 15/235,716.
Office Action dated Oct. 4, 2018 in related U.S. Appl. No. 15/217,081.
Office Action mailed Aug. 19, 2019 in related U.S. Appl. No. 15/356,436.
Office Action mailed Aug. 4, 2020 in related U.S. Appl. No. 16/385,070.
Office Action mailed Dec. 12, 2018 in related U.S. Appl. No. 16/160,708.
Office Action mailed Jan. 30, 2019 in related Canadian Patent Application No. 2,936,997.
Office Action mailed Jun. 11, 2019 in corresponding U.S. Appl. No. 16/210,749.
Office Action mailed Jun. 22, 2020 in relate U.S. Appl. No. 16/377,861.
Office Action mailed Jun. 29, 2020 in related U.S. Appl. No. 16/404,283.
Office Action mailed Jun. 29, 2020 in related U.S. Appl. No. 16/728,359.
Office Action mailed Jun. 7, 2019 in corresponding U.S. Appl. No. 16/268,030.
Office Action mailed Mar. 1, 2019 in related Canadian Patent Application No. 2,943,275.
Office Action mailed May 10, 2019 in corresponding U.S. Appl. No. 16/268,030.
Office Action mailed Oct. 11, 2019 in related U.S. Appl. No. 16/385,070.
Office Action mailed Oct. 2, 2019 in related U.S. Appl. No. 16/152,732.
Office Action mailed Sep. 11, 2019 in related U.S. Appl. No. 16/268,030.
Office Action mailed Sep. 20, 2019 in related U.S. Appl. No. 16/443,273.
Office Action mailed Sep. 3, 2019 in related U.S. Appl. No. 15/994,772.
Schlumberger, "Jet Manual 23, Fracturing Pump Units, SPF/SPS-343, Version 1.0" Jan. 31, 2007, 68 pages.
Stewart & Stevenson, "Stimulation Systems," 2007, 20 pages.
UK Power Networks , "Transformers to Supply Heat to Tate Modern", UK Power Networks, from press releases May 16, 2013.
IPR2021-01033, Paper 41 Final Written Decision concerning U.S. Pat. No. 8,789,601, Jan. 4, 2023, 80 pages.
File History for U.S. Pat. No. 11,136,870, Oct. 5, 2021, 273 pages.
Case No. IPR2023-00558, Patent Owner's Response, Dec. 1, 2023, 63 pages.
Case No. IPR2023-00558, Petition for Inter Partes Review of Claims 1-16 of U.S. Pat. No. 11,136,870, Feb. 10, 2023, 82 pages.
Case No. IPR2023-00558, Petitioner's Reply to Patent Owner's Response, Feb. 23, 2024, 39 pages.
*Halliburton Energy Services, Inc., et al.* v. *U.S. Well Services, LLC*, No. 6:22-CV-00906-ADA-DTG, Dkt. 50, Joint Motion to Extend Scheduling Deadlines, Feb. 8, 2023, 3 pages.
*Halliburton Energy Services, Inc., et al.* v. *U.S. Well Services, LLC*, No. 6:22-cv-00906-ADA-DTG, Dkt. 50-1, Joint Motion to Extend Scheduling Deadlines, Feb. 8, 2023, 4 pages.
Gardner Denver, Well Servicing Pump Model GD-2500Q Quintuplex—Operating and Service Manual, Aug. 2005, 46 pages, 2005, 46 pages.
Declaration of Dr. Robert Durham IPR of U.S. Pat. No. 11,136,870, 2023, 148 pages.
Case No. IPR2023-00558, Patent Owner's Sur-Reply, Mar. 22, 2024, 33 pages.
Declaration of Robert Schaaf from *U.S. Well Services, LLC* v. *Tops Well Services, LLC et al.*, No. 3:19-cv-00237, Dkt. 72-9, Apr. 24, 2020, 227 pages.
G7 ASD Operation Manual, May 27, 2022, 241 pages.

(56) References Cited

OTHER PUBLICATIONS

Declaration of Nathaniel E. Frank-White, custodian of records for Internet Archive regarding Toshiba documents, May 27, 2022, 57 pages.
Declaration of Nathaniel E. Frank-White, custodian of records for Internet Archive regarding Ex. 1037, Jun. 21, 2022, 16 pages.
Declaration of Nathaniel E. Frank-White, custodian of records for Internet Archive regarding Ex. 1037, Jun. 21, 2022, 20 pages.
Deposition Transcript of Robert Schaaf taken in IPR2021-01032, IPR2021-01034, IPR2021-01036, IPR2021-01038, Jun. 29, 2022, 248 pages.
Declaration of Duncan Hall, Jun. 7, 2021, 13 pages.
Deposition Transcript of Robert Schaaf taken in IPR2021-01033, Jul. 1, 2022, 149 pages.
Declaration of Duncan Hall, custodian of records for Internet Archive regarding Gardner, Jul. 7, 2021, 76 pages.
File History for U.S. Pat. No. 9,410,410, Aug. 9, 2016, 328 pages.
"Adjustable Speed Electrical Power Drive Systems, Part 4: General Requirements—Rating Specifications for a.c. Power Drive Systems above 1000 V a.c. and Not Exceeding 35 kV", National Electrical Manufacturers Association (NEMA) Standards Publication ICS 61800-4-2004, 2004, 22 pages.
"America's First Power Generating Gas Turbine", ASME Landmark, https://www.asme.org/wwwasmeorg/media/resourcefiles/aboutasme/who%20we%20are/engineering%20history/landmarks/100-belle-isle-gas-turbine.pdf, last accessed Feb. 6, 2023, 19 pages.
"Fast and Easy Installation for Mobile Power", Solar Mobile Turbomachinery, Solar Turbines: A Caterpillar Company, https://www.solarturbines.com/en_US/solutions/oil-and-gas/solar-mobileturbomachinery.html (last accessed on Feb. 6, 2023), 4 pages.
"G7 Adjustable Speed Drive Operation Manual", Toshiba International Corporation, Document No. 51546-009, 2005, 221 pages.
"GE TM2500+ Aeroderivative Mobile Gas Turbine Brochure", https://web.archive.org/web/20140717215045/https://www.gedistributedpower.com/component/cck/?task=download&file=seb_media_document&id=13183, Jul. 17, 2014, 6 pages.
"Generator Sets, Solar Turbines: A Caterpillar Company", Oil and Gas Industry Packages, https://web.archive.org/web/20060318215809/http://mysolar.cat.com/cda/layout?m=36056&x=7, Mar. 18, 2006, 10 pages.
"GTS Admiral W.M. Callaghan", U.S. Department of Transportation, Maritime Administration, https://maritime.dot.gov/multimedia/gts-admiral-wm-callaghan, last accessed on Feb. 6, 2023, 3 pages.
"GX7 Low Voltage Severe Duty Specialty", Toshiba, https://web.archive.org/web/20101123025808/http://www.toshiba.com/ind/product_display.jsp?id1=7&id2=601, Nov. 23, 2012, 2 pages.
"Oil & Gas", Toshiba International Corporation, last accessed Feb. 6, 2023, 1 page.
"TM2500+™ Mobile Gas Turbine Generator Fact Sheet", GE Power & Water, https://web.archive.org/web/20140625063653/https://www.gedistributedpower.com/, Jun. 25, 2014, 2 pages.
"Toshiba Low Voltage Adjustable Speed Drives", Integrated Power Services, Accessed Feb. 6, 2023, 1 page.
"Turbomachinery Systems For Oil and Gas Applications", Solar Turbines Caterpillar Company, https://web.archive.org/web/20061102043710/http://mysolar.cat.com/cda/files/127587/7/bo&g.pdf, Nov. 2, 2006, 12 pages.
Avallone, Eugene A, et al., "Mark's Standard Handbook for Mechanical Engineers", Eleventh Edition, McGraw-Hill Companies, New York, 2007, 2007, 11 pages.
Bentein, Jim , "Drying Out", Oilweek vol. 64 No. 3, Mar. 2013, 2013, 9 pages.

Bonnet, Austin H, "Root Cause Failure Analysis for AC Induction motors in the Petroleum and Chemical Industry", Industry Applications Society 57th Annual Petroleum and Chemical Industry Conference, 2010., 2010, 13 pages.
Chang, C M, "An N-P-N high power fast germanium core driver transistor", 1957 International Electron Devices Meeting, Washington, DC, USA, pp. 114-114, doi: 10.1109/IEDM.1957.187057, 1957, 1 page.
Dewinter, Frank A, et al., "The Application of a 3500-hp Variable Frequency Drive for Pipeline Pump Control", Record of Conference Papers., Industrial Applications Society 35th Annual Petroleum and Chemical Industry Conference, Dallas, TX, USA, 1988, pp. 133-138, doi: 10.1109/PCICON.1988.22429., 1988, 6 pages.
Fink, Donald G, "Standard Handbook for Electrical Engineers", 13th ed., McGraw-Hill, New York, 1993, 6 pages.
Fink, Donald G, "Standard Handbook for Electrical Engineers", 13th ed., McGraw-Hill, New York, 1993, 7 pages.
Fink, Donald G, "Standard Handbook for Electrical Engineers", 13th ed., McGraw-Hill, New York: 1993, 1993, 9 pages.
Golden, Forest B, "Liquid Cooling of Power Thyristors", IEEE Transactions on Industry Applications, vol. IA-8, No. 5, pp. 601-606, Sep. 1972, doi: 10.1109/TIA. 1972.349789, 1972, 6 pages.
Hefner, Allen R, et al., "A Dynamic Electro-Thermal Model for the IGBT", Conference Record of the 1992 IEEE Industry Applications Society Annual Meeting, 1094-104 vol. 1, 1992, 11 pages.
Hickok, Herbert N, "Adjustable Speed-A Tool for Saving Energy Losses in Pumps, Fans, Blowers, and Compressors", IEEE Transactions on Industry Applications, vol. IA-21, No. 1, pp. 124-136, 1985, doi: 10.1109/TIA. 1985.349672., 1985, 13 pages.
Hilbert, Claude , et al., "High performance air cooled heat sinks for integrated circuits", IEEE Transactions on Components, Hybrids, and Manufacturing Technology, 13: 1022-31, 1990, 10 pages.
Iverson, Arthur , et al., "A uniform temperature, ultra high heat flux liquid cooled, power semiconductor package", Conference Record of the IEEE Industry Applications Society Annual Meeting, San Diego, CA, USA, 1989, pp. 1340-1347 vol. 2, doi: 10.1109/IAS. 1989.96817, 1989, 8 pages.
Lockley, Bill , et al., "IEEE Std 1566—The Need for a Large Adjustable Speed Drive Standard", 2006 Record of Conference Papers—IEEE Industry Applications Society 53rd Annual Petroleum and Chemical Industry Conference, 11-15 Sep. 2006, pp. 1-10, doi: 10.1109/PCICON.2006.359687, 2006, 10 pages.
Perrin, Martin , et al., "Induction Motors, Reciprocating Compressors and Variable Frequency Drives", Record of Conference Papers. IEEE Industry Applications Society 44th Annual Petroleum and Chemical Industry Conference, Sep. 15-17, 1997, pp. 1-9, doi: 10.1109/PCICON.1997.648162., 1997, 9 pages.
Roethemeyer, Dale E, et al., "Evolution of Motor and Variable Frequency Drive Technology", Aceee Summer Study Proceedings on Energy Efficiency in Industry, 1995, pp. 541-552., 1995, 12 pages.
Shepherd, William , et al., "Unbalanced Voltage Control of 3-Phase Loads by the Triggering of Silicon Controlled Rectifiers", IEEE Transactions on Industry and General Applications, vol. IGA-1, No. 3, pp. 206-216, 1965, doi: 10.1109/TIGA. 1965.4180543, 1965, 11 pages.
Vidal, Katherine K, Memorandum regarding Interim Procedure for Discretionary Denials in AIA Post-Grant Proceedings with Parallel District Court Litigation, Jun. 21, 2022, 9 pages.
"IPR Decision USWEL-003003", *Halliburton Energy Services, Inc.*, Petitioner, v. U.S. *Well Services, LLC*, Patent Owner. IPR2023-00558. Patent 11, 136,870 B2, Aug. 12, 2024, 114 pages.

\* cited by examiner

SYSTEM FOR PUMPING HYDRAULIC FRACTURING FLUID USING ELECTRIC PUMPS This application is a continuation of U.S. patent application Ser. No. 17/493,092, filed Oct. 4, 2021 titled "SYSTEM FOR PUMPING HYDRAULIC FRACTURING FLUID USING ELECTRIC PUMPS," which is a continuation of U.S. patent application Ser. No. 16/456,777, filed Jun. 28, 2019, titled "SYSTEM FOR PUMPING HYDRAULIC FRACTURING FLUID USING ELECTRIC PUMPS," now U.S. Pat. No. 11,136,870, issued Oct. 5, 2021, which is a continuation of U.S. patent application Ser. No. 15/202,085, filed Jul. 5, 2016, titled "SYSTEM FOR PUMPING HYDRAULIC FRACTURING FLUID USING ELECTRIC PUMPS," now U.S. Pat. No. 10,337,308, issued Jul. 2, 2019, which is a continuation of U.S. patent application Ser. No. 13/679,689, filed Nov. 16, 2012, titled "SYSTEM FOR PUMPING HYDRAULIC FRACTURING FLUID USING ELECTRIC PUMPS," now U.S. Pat. No. 9,410,410, issued Aug. 9, 2016. The disclosures of U.S. patent application Ser. No. 17/493,092, U.S. patent application Ser. No. 16/456,777, U.S. patent application Ser. No. 15/202,085, and U.S. patent application Ser. No. 13/679,689 are each incorporated by reference.

BACKGROUND OF THE INVENTION

1. Field of the Invention

This technology relates to hydraulic fracturing in oil and gas wells. In particular, this technology relates to pumping fracturing fluid into an oil or gas well using pumps powered by electric motors.

2. Brief Description of Related Art

Hydraulic fracturing has been used for decades to stimulate production from conventional oil and gas wells. The practice consists of pumping fluid into a wellbore at high pressure. Inside the wellbore, the fluid is forced into the formation being produced. When the fluid enters the formation, it fractures, or creates fissures, in the formation. Water, as well as other fluids, and some solid proppants, are then pumped into the fissures to stimulate the release of oil and gas from the formation.

Fracturing rock in a formation requires that the fracture fluid be pumped into the wellbore at very high pressure. This pumping is typically performed by large diesel-powered pumps. Such pumps are able to pump fracturing fluid into a wellbore at a high enough pressure to crack the formation, but they also have drawbacks. For example, the diesel pumps are very heavy, and thus must be moved on heavy duty trailers, making transport of the pumps between oilfield sites expensive and inefficient. In addition, the diesel engines required to drive the pumps require a relatively high level of expensive maintenance. Furthermore, the cost of diesel fuel is much higher than in the past, meaning that the cost of running the pumps has increased.

What is needed therefore, is a pump system for hydraulic fracturing fluid that overcomes the problems associated with diesel pumps.

SUMMARY OF THE INVENTION

Disclosed herein is a system for hydraulically fracturing an underground formation in an oil or gas well to extract oil or gas from the formation, the oil or gas well having a wellbore that permits passage of fluid from the wellbore into the formation. The system includes a plurality of electric pumps fluidly connected to the well, and configured to pump fluid into the wellbore at high pressure so that the fluid passes from the wellbore into the formation, and fractures the formation. The system also includes a plurality of generators electrically connected to the plurality of electric pumps to provide electrical power to the pumps. At least some of the plurality of generators can be powered by natural gas. In addition, at least some of the plurality of generators can be turbine generators.

In one embodiment, the system further includes an A/C console and a variable frequency drive that controls the speed of the pumps. Furthermore, the electric pumps, as well as the electric generators, can be mounted on vehicles, and can be ported from one well to another. The vehicles can be trucks and can have at least five axles.

Further disclosed herein is a system for fracturing a rock formation in an oil or gas well by pumping hydraulic fracturing fluid into the well that includes a pump, an electric motor, a variable frequency drive, and a natural gas powered electric generator. The pump is configured for pumping the hydraulic fracturing fluid into the well, and then from the well into the formation, and is capable of pumping the hydraulic fracturing fluid at high pressure to crack the formation. The electric motor can have a high-strength steel or steel alloy shaft attached to the pump and configured to drive the pump. The variable frequency drive can be connected to the electric motor to control the speed of the motor. In addition, the natural gas powered generator, which can be a turbine generator, can be connected to the electric motor and provide electric power to the electric motor.

In one embodiment, the pump can be a triplex or a quinteplex pump, optionally rated at about 2250 hydraulic horsepower or more. In addition, the pump can also have 4.5 inch diameter plungers with an eight inch stroke. In another embodiment, the electric motor can have a maximum continuous power output of about 1500 brake horsepower, 1750 brake horsepower, or more, and a maximum continuous torque of about 8750 lb-ft or more. Furthermore, the electric motor can have a high temperature rating of about 1100 degrees C. or more, and a shaft composed of 4340 alloy steel.

In another embodiment, variable frequency drive can frequently perform electric motor diagnostics to prevent damage to the electric motor if it becomes grounded or shorted. In addition, the variable frequency drive can include power semiconductor heat sinks having one or more thermal sensors monitored by a microprocessor to prevent semiconductor damage caused by excessive heat.

Also disclosed herein is a system for hydraulically fracturing an underground formation in an oil or gas well to extract oil or gas from the formation, the oil or gas well having a wellbore that permits passage of fluid from the wellbore into the formation. The system includes a trailer for attachment to a truck. Two or more electric pumps can be attached to the trailer and are fluidly connected to the well, the electric pumps configured to pump fluid into the wellbore at high pressure so that the fluid passes from the wellbore into the formation, and fractures the formation. One or more electric motors are attached to the electric pumps to drive the pumps. The electric motors can also be attached to the trailer. A natural gas powered generator is provided for connection to the electric motor to provide electric power to the electric motor. The system of claim can further include a variable frequency drive attached to the trailer and connected to the electric motor to control the speed of the motor. In addition, the system can include a skid to which at least one of the electric pumps, the one or more electric motors, and the variable frequency drives are attached.

Also disclosed herein is a process for stimulating an oil or gas well by hydraulically fracturing a formation in the well. The process includes the steps of pumping fracturing fluid into the well with an electrically powered pump at a high pressure so that the fracturing fluid enters and cracks the formation, the fracturing fluid having at least a liquid component and a solid proppant, and inserting the solid proppant into the cracks to maintain the cracks open, thereby allowing passage of oil and gas through the cracks. The process can further include powering the electrically powered pump with a natural gas generator, such as, for example, a turbine generator.

BRIEF DESCRIPTION OF THE DRAWINGS

The present technology will be better understood on reading the following detailed description of nonlimiting embodiments thereof, and on examining the accompanying drawing, in which.

DETAILED DESCRIPTION OF THE PREFERRED EMBODIMENT

Figure 1:
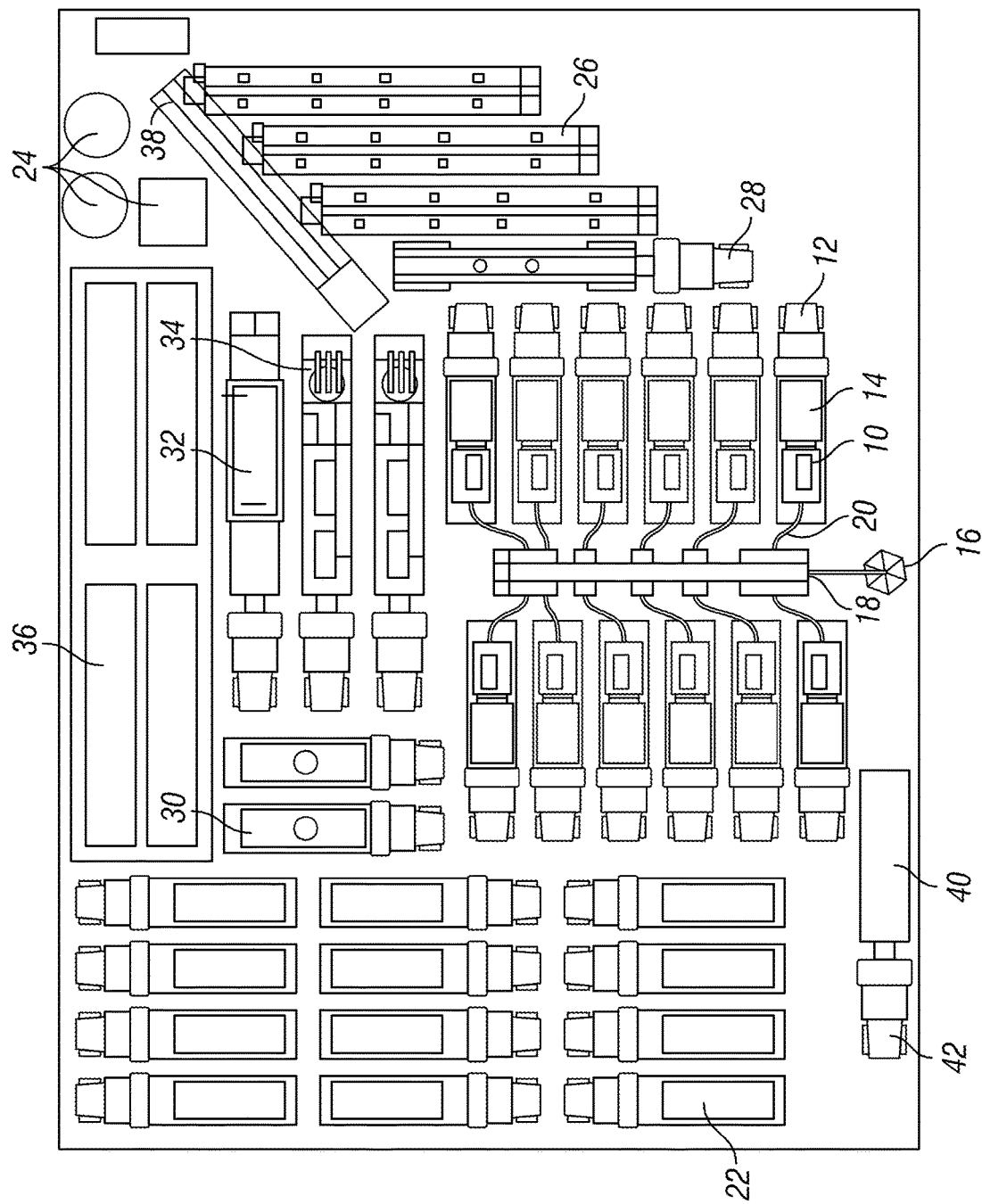
FIG. 1 is a schematic plan view of equipment used in a hydraulic fracturing operation, according to an embodiment of the present technology.

The foregoing aspects, features, and advantages of the present technology will be further appreciated when considered with reference to the following description of preferred embodiments and accompanying drawing, wherein like reference numerals represent like elements. In describing the preferred embodiments of the technology illustrated in the appended drawing, specific terminology will be used for the sake of clarity. However, the technology is not intended to be limited to the specific terms used, and it is to be understood that each specific term includes equivalents that operate in a similar manner to accomplish a similar purpose.

FIG. 1 shows a plan view of equipment used in a hydraulic fracturing operation. Specifically, there is shown a plurality of pumps 10 mounted to pump vehicles 12. The pump vehicles 12 can be trucks having at least five axles. In the embodiment shown, the pumps 10 are powered by electric motors 14, which can also be mounted to the pump vehicles 12. The pumps 10 are fluidly connected to the wellhead 16 via the missile 18. As shown, the pump vehicles 12 can be positioned near enough to the missile 18 to connect fracturing fluid lines 20 between the pumps 10 and the missile 18. The missile 18 is then connected to the wellhead 16 and configured to deliver fracturing fluid provided by the pumps 10 to the wellhead 16.

In some embodiments, each electric motor 14 can be capable of delivering about 1500 brake horsepower (BHP), 1750 BHP, or more, and each pump 10 can optionally be rated for about 2250 hydraulic horsepower (HHP) or more. In addition, the components of the system, including the pumps 10 and the electric motors 14, can be capable of operating during prolonged pumping operations, and in temperature in a range of about 0 degrees C. or less to about 55 degrees C. or more. In addition, each electric motor 14 can be equipped with a variable frequency drive (VFD), and an A/C console, that controls the speed of the electric motor 14, and hence the speed of the pump 10.

The electric motors 14 of the present technology can be designed to withstand an oilfield environment. Specifically, some pumps 10 can have a maximum continuous power output of about 1500 BHP, 1750 BHP, or more, and a maximum continuous torque of about 8750 lb-ft or more. Furthermore, electric motors 14 of the present technology can include class H insulation and high temperature ratings, such as about 1100 degrees C. or more. In some embodiments, the electric motor 14 can include a single shaft extension and hub for high tension radial loads, and a high strength 4340 alloy steel shaft, although other suitable materials can also be used.

The VFD can be designed to maximize the flexibility, robustness, serviceability, and reliability required by oilfield applications, such as hydraulic fracturing. For example, as far as hardware is concerned, the VFD can include packaging receiving a high rating by the National Electrical Manufacturers Association (such as nema 1 packaging), and power semiconductor heat sinks having one or more thermal sensors monitored by a microprocessor to prevent semiconductor damage caused by excessive heat. Furthermore, with respect to control capabilities, the VFD can provide complete monitoring and protection of drive internal operations while communicating with an operator via one or more user interfaces. For example, motor diagnostics can be performed frequently (e.g., on the application of power, or with each start), to prevent damage to a grounded or shorted electric motor 14. The electric motor diagnostics can be disabled, if desired, when using, for example, a low impedance or high-speed electric motor.

In some embodiments, the pump 10 can optionally be a 2250 HHP triplex or quinteplex pump. The pump 10 can optionally be equipped with 4.5 inch diameter plungers that have an eight (8) inch stroke, although other size plungers can be used, depending on the preference of the operator. The pump 10 can further include additional features to increase its capacity, durability, and robustness, including, for example, a 6.353 to 1 gear reduction, autofrettaged steel or steel alloy fluid end, wing guided slush type valves, and rubber spring loaded packing.

In addition to the above, certain embodiments of the present technology can include a skid (not shown) for supporting some or all of the above-described equipment. For example, the skid can support the electric motor 14 and the pump 10. In addition, the skid can support the VFD. Structurally, the skid can be constructed of heavy-duty longitudinal beams and cross-members made of an appropriate material, such as, for example, steel. The skid can further include heavy-duty lifting lugs, or eyes, that can optionally be of sufficient strength to allow the skid to be lifted at a single lift point.

Referring back to FIG. 1, also included in the equipment is a plurality of electric generators 22 that are connected to, and provide power to, the electric motors 14 on the pump vehicles 12. To accomplish this, the electric generators 22 can be connected to the electric motors 14 by power lines (not shown). The electric generators 22 can be connected to the electric motors 14 via power distribution panels (not shown). In certain embodiments, the electric generators 22 can be powered by natural gas. For example, the generators can be powered by liquefied natural gas. The liquefied natural gas can be converted into a gaseous form in a vaporizer prior to use in the generators. The use of natural gas to power the electric generators 22 can be advantageous because, where the well is a natural gas well, above ground natural gas vessels 24 can already be placed on site to collect natural gas produced from the well. Thus, a portion of this natural gas can be used to power the electric generators 22, thereby reducing or eliminating the need to import fuel from offsite. If desired by an operator, the electric generators 22 can optionally be natural gas turbine generators, such as those shown in FIG. 2.

FIG. 1 also shows equipment for transporting and combining the components of the hydraulic fracturing fluid used in the system of the present technology. In many wells, the fracturing fluid contains a mixture of water, sand or other proppant, acid, and other chemicals. Examples of fracturing fluid components include acid, anti-bacterial agents, clay stabilizers, corrosion inhibitors, friction reducers, gelling agents, iron control agents, pH adjusting agents, scale inhibitors, and surfactants. Historically, diesel has at times been used as a substitute for water in cold environments, or where a formation to be fractured is water sensitive, such as, for example, clay. The use of diesel, however, has been phased out over time because of price, and the development of newer, better technologies.

In FIG. 1, there are specifically shown sand transporting vehicles 26, an acid transporting vehicle 28, vehicles for transporting other chemicals 30, and a vehicle carrying a hydration unit 32, such as, for example, a water pump. Also shown are fracturing fluid blenders 34, which can be configured to mix and blend the components of the hydraulic fracturing fluid, and to supply the hydraulic fracturing fluid to the pumps 10. In the case of liquid components, such as water, acids, and at least some chemicals, the components can be supplied to the blenders 34 via fluid lines (not shown) from the respective component vehicles, or from the hydration unit 32. In the case of solid components, such as sand, the component can be delivered to the blender 34 by a conveyor belt 38. The water can be supplied to the hydraulic unit 32 from, for example, water tanks 36 onsite. Alternately, the water can be provided by water trucks. Furthermore, water can be provided directly from the water tanks 36 or water trucks to the blender 34, without first passing through the hydration unit 32.

Pump control and data monitoring equipment 40 can be mounted on a control vehicle 42, and connected to the pumps 10, electric motors 14, blenders 34, and other downhole sensors and tools (not shown) to provide information to an operator, and to allow the operator to control different parameters of the fracturing operation. For example, the pump control and data monitoring equipment 40 can include an A/C console that controls the VFD, and thus the speed of the electric motor 14 and the pump 10. Other pump control and data monitoring equipment can include pump throttles, a pump VFD fault indicator with a reset, a general fault indicator with a reset, a main estop, a programmable logic controller for local control, and a graphics panel. The graphics panel can include, for example, a touchscreen interface.

Figure 2:
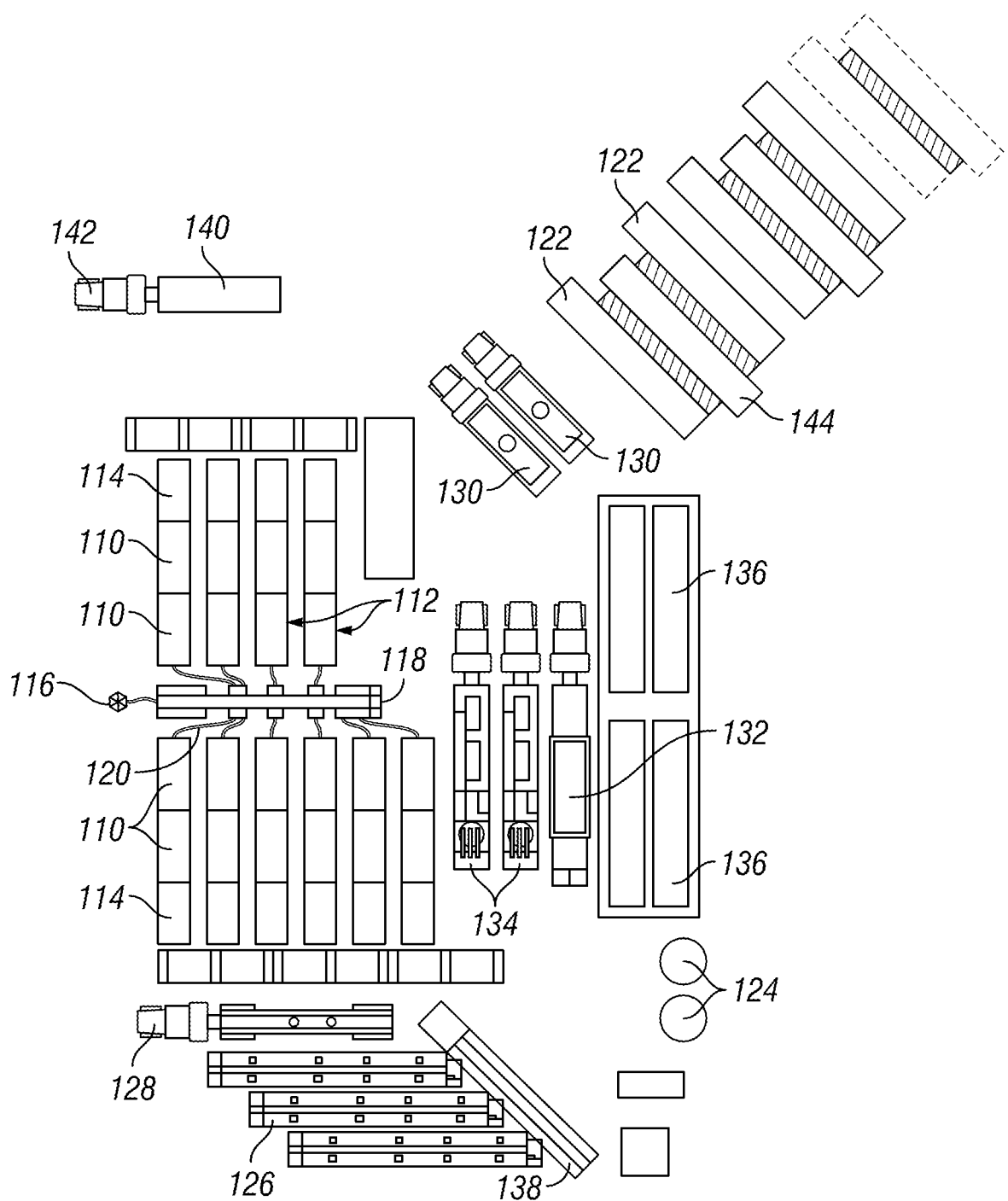
FIG. 2 is a schematic plan view of equipment used in a hydraulic fracturing operation, according to an alternate embodiment of the present technology.

Referring now to FIG. 2, there is shown an alternate embodiment of the present technology. Specifically, there is shown a plurality of pumps 110 which, in this embodiment, are mounted to pump trailers 112. As shown, the pumps 110 can optionally be loaded two to a trailer 112, thereby minimizing the number of trailers needed to place the requisite number of pumps at a site. The ability to load two pumps 110 on one trailer 112 is possible because of the relatively light weight of the electric pumps 110 compared to other known pumps, such as diesel pumps. In the embodiment shown, the pumps 110 are powered by electric motors 114, which can also be mounted to the pump trailers 112. Furthermore, each electric motor 114 can be equipped with a VFD, and an A/C console, that controls the speed of the motor 114, and hence the speed of the pumps 110.

In addition to the above, the embodiment of FIG. 2 can include a skid (not shown) for supporting some or all of the above-described equipment. For example, the skid can support the electric motors 114 and the pumps 110. In addition, the skid can support the VFD. Structurally, the skid can be constructed of heavy-duty longitudinal beams and crossmembers made of an appropriate material, such as, for example, steel. The skid can further include heavy-duty lifting lugs, or eyes, that can optionally be of sufficient strength to allow the skid to be lifted at a single lift point.

The pumps 110 are fluidly connected to a wellhead 116 via a missile 118. As shown, the pump trailers 112 can be positioned near enough to the missile 118 to connect fracturing fluid lines 120 between the pumps 110 and the missile 118. The missile 118 is then connected to the wellhead 116 and configured to deliver fracturing fluid provided by the pumps 110 to the wellhead 116.

Still referring to FIG. 2, this embodiment also includes a plurality of turbine generators 122 that are connected to, and provide power to, the electric motors 114 on the pump trailers 112. To accomplish this, the turbine generators 122 can be connected to the electric motors 114 by power lines (not shown). The turbine generators 122 can be connected to the electric motors 114 via power distribution panels (not shown). In certain embodiments, the turbine generators 122 can be powered by natural gas, similar to the electric generators 22 discussed above in reference to the embodiment of FIG. 1. Also included are control units 144 for the turbine generators 122.

The embodiment of FIG. 2 can include other equipment similar to that discussed above. For example, FIG. 2 shows sand transporting vehicles 126, acid transporting vehicles 128, other chemical transporting vehicles 130, hydration units 132, blenders 134, water tanks 136, conveyor belts 138, and pump control and data monitoring equipment 140 mounted on a control vehicle 142. The function and specifications of each of these is similar to corresponding elements shown in FIG. 1.

Use of pumps 10, 110 powered by electric motors 14, 114 and natural gas powered electric generators 22 (or turbine generators 122) to pump fracturing fluid into a well is advantageous over known systems for many different reasons. For example, the equipment (e.g. pumps, electric motors, and generators) is lighter than the diesel pumps commonly used in the industry. The lighter weight of the equipment allows loading of the equipment directly onto a truck body. In fact, where the equipment is attached to a skid, as described above, the skid itself can be lifted on the truck body, along with all the equipment attached to the skid, in one simple action. Alternatively, and as shown in FIG. 2, trailers 112 can be used to transport the pumps 110 and electric motors 114, with two or more pumps 110 carried on a single trailer 112. Thus, the same number of pumps 110 can be transported on fewer trailers 112. Known diesel pumps, in contrast, cannot be transported directly on a truck body or two on a trailer, but must be transported individually on trailers because of the great weight of the pumps.

The ability to transfer the equipment of the present technology directly on a truck body or two to a trailer increases efficiency and lowers cost. In addition, by eliminating or reducing the number of trailers to carry the equipment, the equipment can be delivered to sites having a restricted amount of space, and can be carried to and away from worksites with less damage to the surrounding environment. Another reason that the electric pump system of the present technology is advantageous is that it runs on natural gas. Thus, the fuel is lower cost, the components of the system require less maintenance, and emissions are lower, so that potentially negative impacts on the environment are reduced.

In practice, a hydraulic fracturing operation can be carried out according to the following process. First, the water, sand, and other components are blended to form a fracturing fluid, which is pumped down the well by the electric-powered pumps. Typically, the well is designed so that the fracturing fluid can exit the wellbore at a desired location and pass into the surrounding formation. For example, in some embodiments the wellbore can have perforations that allow the fluid to pass from the wellbore into the formation. In other embodiments, the wellbore can include an openable sleeve, or the well can be open hole. The fracturing fluid can be pumped into the wellbore at a high enough pressure that the fracturing fluid cracks the formation, and enters into the cracks. Once inside the cracks, the sand, or other proppants in the mixture, wedges in the cracks, and holds the cracks open.

Using the pump control and data monitoring equipment 40, the operator can monitor, gauge, and manipulate parameters of the operation, such as pressures, and volumes of fluids and proppants entering and exiting the well. For example, the operator can increase or decrease the ratio of sand to water as the fracturing process progresses and circumstances change.

This process of injecting fracturing fluid into the wellbore can be carried out continuously, or repeated multiple times in stages, until the fracturing of the formation is optimized. Optionally, the wellbore can be temporarily plugged between each stage to maintain pressure, and increase fracturing in the formation. Generally, the proppant is inserted into the cracks formed in the formation by the fracturing, and left in place in the formation to prop open the cracks and allow oil or gas to flow into the wellbore.

While the technology has been shown or described in only some of its forms, it should be apparent to those skilled in the art that it is not so limited, but is susceptible to various changes without departing from the scope of the technology. Furthermore, it is to be understood that the above disclosed embodiments are merely illustrative of the principles and applications of the present technology. Accordingly, numerous modifications can be made to the illustrative embodiments and other arrangements can be devised without departing from the spirit and scope of the present technology as defined by the appended claims.

What is claimed is:

1. A hydraulic fracturing system for fracturing a subterranean formation, the hydraulic fracturing system comprising:
   a hydraulic fracturing pump configured to pump fracturing fluid;
   an electric motor configured to drive the hydraulic fracturing pump; and
   a variable frequency drive (VFD) configured to control a speed of the electric motor, the VFD comprising:
   a heat sink comprising a thermal sensor, the heat sink coupled to power semiconductor components of the VFD;
   a microprocessor configured to monitor the thermal sensor; and
   one or more user interfaces configured to provide information to an operator.

2. The hydraulic fracturing system of claim 1, further comprising an electric generator electrically coupled to the electric motor to provide electric power to the electric motor.

3. The hydraulic fracturing system of claim 2, wherein the electric generator is a gas turbine generator.

4. The hydraulic fracturing system of claim 1, wherein the hydraulic fracturing pump is a triplex or quintaplex pump.

5. The hydraulic fracturing system of claim 1, wherein the hydraulic fracturing pump comprises a 6.353 to 1 gear reduction.

6. The hydraulic fracturing system of claim 1, further comprising a trailer that supports the hydraulic fracturing pump, the motor, and the VFD.

7. The hydraulic fracturing system of claim 6, wherein the hydraulic fracturing pump comprises at least two hydraulic pumps.

8. The hydraulic fracturing system of claim 6, further comprising a skid that is supported by the trailer, the skid supporting the hydraulic fracturing pump, the motor, and the VFD.

9. The hydraulic fracturing system of claim 1, wherein the VFD performs motor diagnostics.

10. The hydraulic fracturing system of claim 9, wherein the motor diagnostics comprises detection of an electrical short circuit or an electrical ground fault.

11. A hydraulic fracturing method, comprising:
    operating an electric motor that drives a hydraulic fracturing pump;
    pumping fracturing fluid by operation of the hydraulic fracturing pump;
    by operation of a variable frequency drive (VFD), controlling a speed of the electric motor, wherein the VFD comprises power semiconductor heat sinks, and the heat sinks comprise one or more thermal sensors;
    monitoring the thermal sensors by operation of a microprocessor; and
    communicating with an operator via one or more user interfaces of the VFD.

12. The method of claim 11, comprising, by operation of the VFD, performing motor diagnostics.

13. The method of claim 12, wherein the performing motor diagnostics comprises detecting an electrical short circuit or an electrical ground fault.

14. The method of claim 11, comprising, by operation of an electric generator, providing electric power to the electric motor.

15. The method of claim 11, comprising supporting the hydraulic fracturing pump, the electric motor, and the VFD on a trailer.

16. The method of claim 15, comprising supporting the hydraulic fracturing pump, the motor, and the VFD on a skid that is supported on the trailer.

17. The method of claim 11, wherein the thermal sensors are monitored to prevent damage to power semiconductors of the VFD.

* * * * *